United States Patent
Avupati et al.

(10) Patent No.: US 11,283,203 B1
(45) Date of Patent: Mar. 22, 2022

(54) GROUNDING CLAMP

(71) Applicant: HONEYWELL INTERNATIONAL INC., Charlotte, NC (US)

(72) Inventors: Ravi Kumar Avupati, Hyderabad (IN); Alfred R. Flojo, Lincolnshire, IL (US); Christy E. Garippo, Woodridge, IL (US); Linda S. Ziegler-Robinson, Fort Mill, SC (US); Rizwan Ahmad, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/247,337

(22) Filed: Dec. 8, 2020

(51) Int. Cl.
  *H01R 11/15* (2006.01)
(52) U.S. Cl.
  CPC .................................. *H01R 11/15* (2013.01)
(58) Field of Classification Search
  CPC ......... H01R 11/15; H01R 11/14; H01R 11/26; H01R 11/24
  See application file for complete search history.

(56) References Cited

U.S. PATENT DOCUMENTS

| | | | | |
|---|---|---|---|---|
| 2,508,778 | A * | 5/1950 | Spears | H02B 3/00 439/479 |
| 4,105,272 | A * | 8/1978 | West | H01R 11/15 439/479 |
| 5,556,299 | A * | 9/1996 | Finke | H01R 11/15 439/479 |
| 6,891,106 | B2 | 5/2005 | Sumner | |
| 7,160,142 | B2 * | 1/2007 | Hughes | H01R 11/14 439/478 |
| 10,673,152 | B2 | 6/2020 | O'Connell et al. | |

FOREIGN PATENT DOCUMENTS

CN  110137716 A  8/2019

* cited by examiner

*Primary Examiner* — Briggitte R. Hammond
(74) *Attorney, Agent, or Firm* — Alston & Bird LLP

(57) ABSTRACT

Various embodiments include a lower jaw assembly and a grounding clamp. The grounding clamp includes a clamp body defining a first side and a second side opposite the first side. The grounding clamp also includes an upper jaw. The grounding clamp further includes a support arm slidably attached to the clamp body. The support arm includes a locking mechanism configured to removably engage the first side of the clamp body and a balance mechanism configured to removably engage the second side of the clamp body. The movement of the support arm is restricted upon the engagement of the locking mechanism and the balance mechanism. The grounding clamp also includes a moveable jaw slideably attached to clamp body and operably coupled to the support arm via a fastening mechanism.

20 Claims, 7 Drawing Sheets

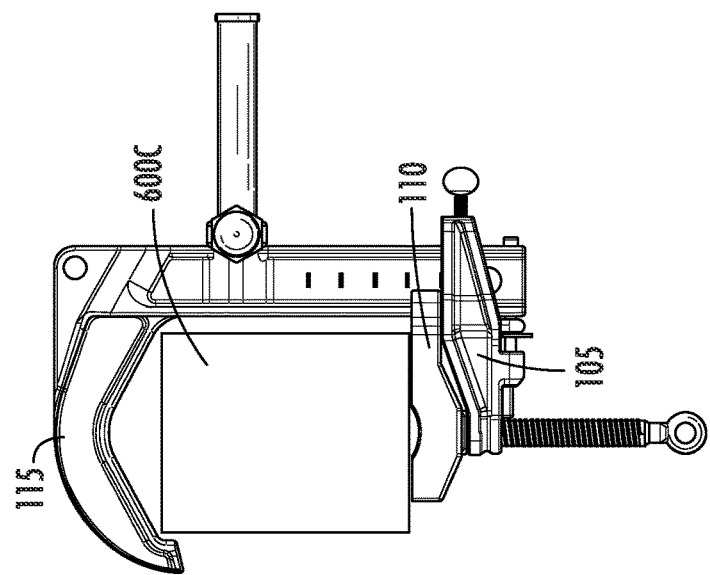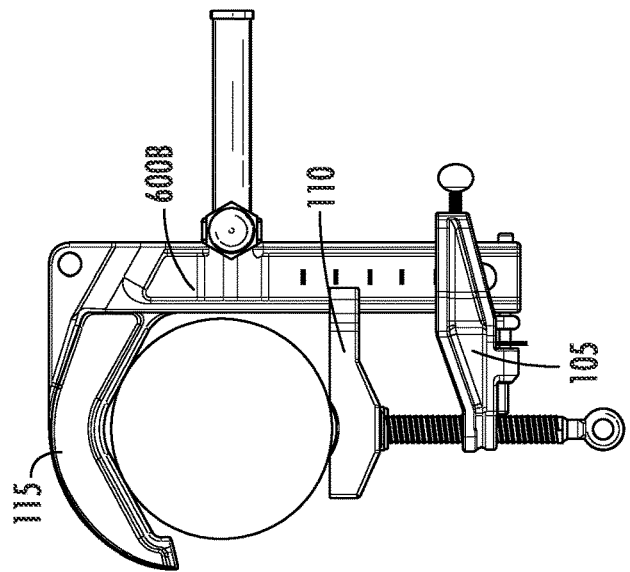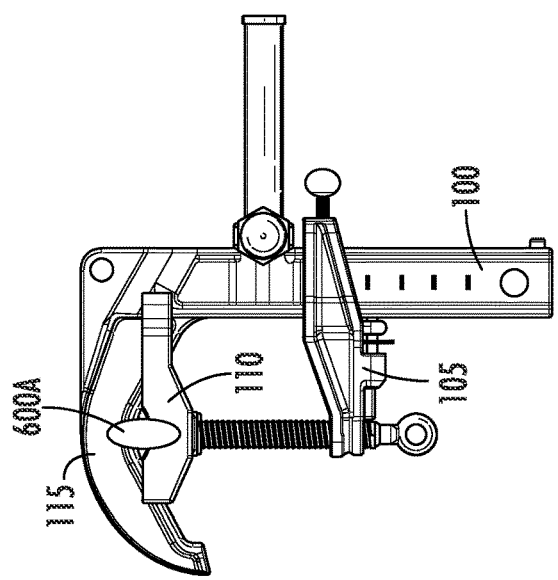

GROUNDING CLAMP

TECHNOLOGICAL FIELD

Example embodiments of the present disclosure relate generally to electrical grounding devices and, more particularly, to electrical grounding clamps.

BACKGROUND

Electrical linemen are often concerned with preventing electrical shocks, especially when working with high voltage/amperage applications. Linemen may use grounding clamps attached to an elongate stick, pole, hot stick, or shotgun stick to grab an electrical conductor (e.g., an electric wire, post, or ball stud) and ground the electrical conductor. Applicant has identified a number of deficiencies and problems associated with conventional grounding devices. Through applied effort, ingenuity, and innovation, many of these identified problems have been solved by developing solutions that are included in embodiments of the present disclosure, many examples of which are described in detail herein.

BRIEF SUMMARY

In an example embodiment, a grounding clamp is provided. The grounding clamp includes a clamp body defining a first side and a second side opposite the first side. The grounding clamp also includes an upper jaw. The grounding clamp further includes a support arm slidably attached to the clamp body. The support arm includes a locking mechanism configured to removably engage the first side of the clamp body and a balance mechanism configured to removably engage the second side of the clamp body. The movement of the support arm is restricted upon the engagement of the locking mechanism and the balance mechanism. The grounding clamp also includes a moveable jaw slideably attached to clamp body and operably coupled to the support arm via a fastening mechanism.

In various embodiments, the balance mechanism is spring actuated, such that the balance mechanism is configured to engage with the clamp body in an instance in which the support arm is at one of a plurality of locking positions. In various embodiments, the balance mechanism further includes a disengaging lever that, upon actuation, disengages the balance mechanism from the clamp body. In various embodiments, the balance mechanism includes a compression spring attached to the support arm on a first end and an engagement pin on a second end, wherein the engagement pin is configured to be moved between an unlocked position and a locking position with the clamp body.

In various embodiments, the clamp body defines a plurality of locking mechanism engagement receivers along the first side of the clamp body and a plurality of balance mechanism engagement receivers along the second side of the clamp body opposite the first side of the clamp body. In such an embodiment, the locking mechanism is engageable with one of the plurality of locking mechanism engagement receivers and the balance mechanism is engageable with one of the plurality of balance mechanism engagement receivers. In various embodiments, the support arm defines a first locking position and a second locking position, wherein the first locking position is defined as a position in which the balance mechanism is aligned with a first balance mechanism engagement receiver of the plurality of balance mechanism engagement receivers and the second locking position is defined as a position in which the balance mechanism is aligned with a second balance mechanism engagement receiver of the plurality of balance mechanism engagement receivers.

In various embodiments, the balance mechanism is configured to movably engage with the first balance mechanism receiver in an instance the support arm is in the first locking position. In various embodiments, the balance mechanism is spring actuated, such that the balance mechanism automatically engages with the first balance mechanism engagement receiver in an instance in which the support arm is in the first locking position. In various embodiments, the locking mechanism is configured to align with a first locking mechanism engagement receiver of the plurality of locking mechanism engagement receivers in an instance in which the support arm is in the first locking position and the locking mechanism is configured to align with a second locking mechanism engagement receiver of the plurality of locking mechanism engagement receivers in an instance in which the support arm is in the second position.

In various embodiment, the distance between the first balance mechanism engagement receiver and the second engagement receiver is equal to the distance between the first locking mechanism engagement receiver and the second locking mechanism engagement receiver. In various embodiments, the clamp body includes a plurality of position markers, a first position marker of the plurality of position markers align with at least one of an upper surface or a lower surface of the support arm in an instance in which the support arm is in the first locking position. In various embodiments, the plurality of balance mechanism engagement receivers are equally distanced from one another along the second side of the clamp body.

In various embodiments, at least one of the locking mechanism or the balance mechanism are configured to engage with the clamp body such that the motion of the support arm is restricted in a first axis along the clamp body. In various embodiments, the clamp body also includes a guiding feature along the second side, such that the motion of the moveable jaw is restricted along a second axis along the clamp body. In various embodiments, the balance mechanism and the locking mechanism includes at least one of a wing screw, a spring-loaded pin, or a pin that is engageable with the clamp body.

In various embodiments, the support arm further includes a threaded aperture configured to receive the fastening mechanism, such that the moveable jaw moves relative to the support arm in an instance the support arm is engaged with the clamp body. In various embodiments, the upper jaw is fixed relative to the clamp body. In various embodiments, the fastening mechanism is configured to be operated via a shotgun stick. In various embodiments, grounding clamp also includes a connection mechanism, the connection mechanism including at least one of a ferrule connection, a ball stud, or a contact stud.

In another example embodiment, a lower jaw assembly is provided for use in a grounding clamp. The lower jaw assembly includes a support arm slidably attached to a clamp body. The support arm includes a locking mechanism configured to removably engage the first side of the clamp body and a balance mechanism configured to removably engage the second side of the clamp body. The movement of the support arm is restricted upon the engagement of the locking mechanism and the balance mechanism. The lower jaw assembly includes a moveable jaw slideably attached to clamp body and operably coupled to the support arm via a fastening mechanism.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIGS. 6A-6C illustrate different conductor size and shapes for use with a grounding clamp according to an example embodiment.

DETAILED DESCRIPTION

Figure 1B:
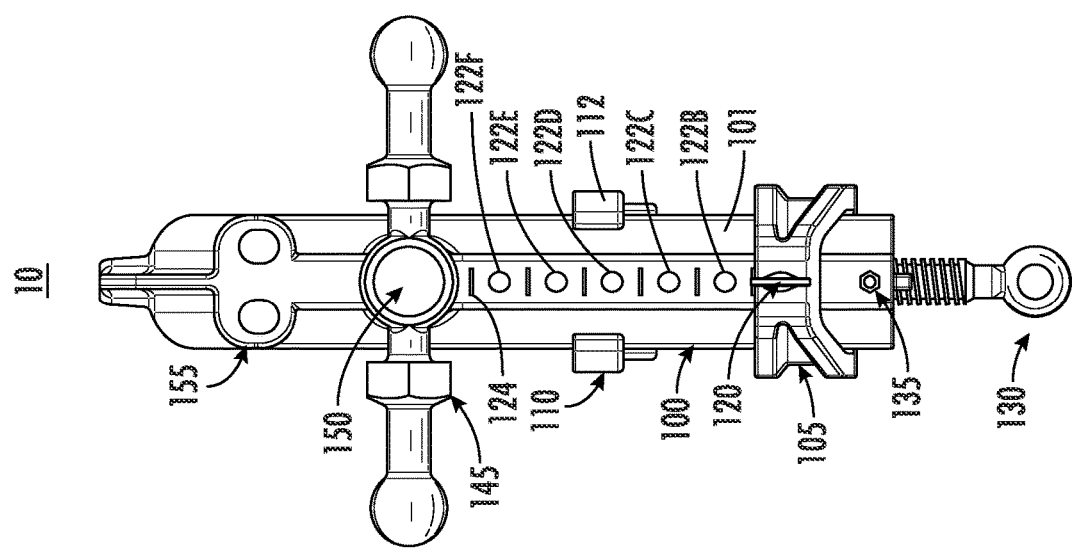
FIG. 1B is a side view of the grounding clamp of FIG. 1A according to an example embodiment.

The present invention now will be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example.

Grounding clamps often have variable operating ranges in which users, such as linemen, can adjust based on the overhead conductor size. The lineman then uses a shotgun stick to grab the overhead wire with the clamp. Once the clamp is caught, then the clamp is tightened by rotation of the shotgun stick. However, such example clamps have deficiencies. For example, the clamps are difficult to lock into different adjustable positions. Additionally or alternatively, example clamps often use a single pivot design that can result in the support arm becoming tilted or otherwise misaligned during tightening resulting in difficulty installing. Apparatuses, systems, and associated methods are described herein for use with grounding devices that address these deficiencies and others by, in some examples, utilizing a balance mechanism included on the support arm.

As discussed herein, various embodiments of a grounding clamp include a lower jaw assembly having a moveable jaw and a support arm operably coupled to one another. In various embodiments, the moveable jaw may be configured to move relative to the support arm. In some examples, the position of the moveable jaw (e.g., the relative position between the moveable jaw and the support arm) determines or is otherwise related to the conductor size, as the moveable jaw and an upper jaw that is fixed relative to the clamp body engages with a conductor during operation.

In various example embodiments, the support arm includes both a locking mechanism and a balance mechanism that engage with opposite sides of the clamp body. The locking mechanism and the balance mechanism, in an instance in which both are engaged with the clamp body, resist the movement of the support arm along the clamp body and the rotational movement of the support arm about the point of engagement for the locking mechanism. In various embodiments, the balance mechanism may be spring-loaded, so as to assist in the positioning of the support arm into engagement with the clamp body. The moveable jaw may move relative to the support arm, such that the range of motion of the moveable arm is based on the position of the support arm.

Figure 1A:
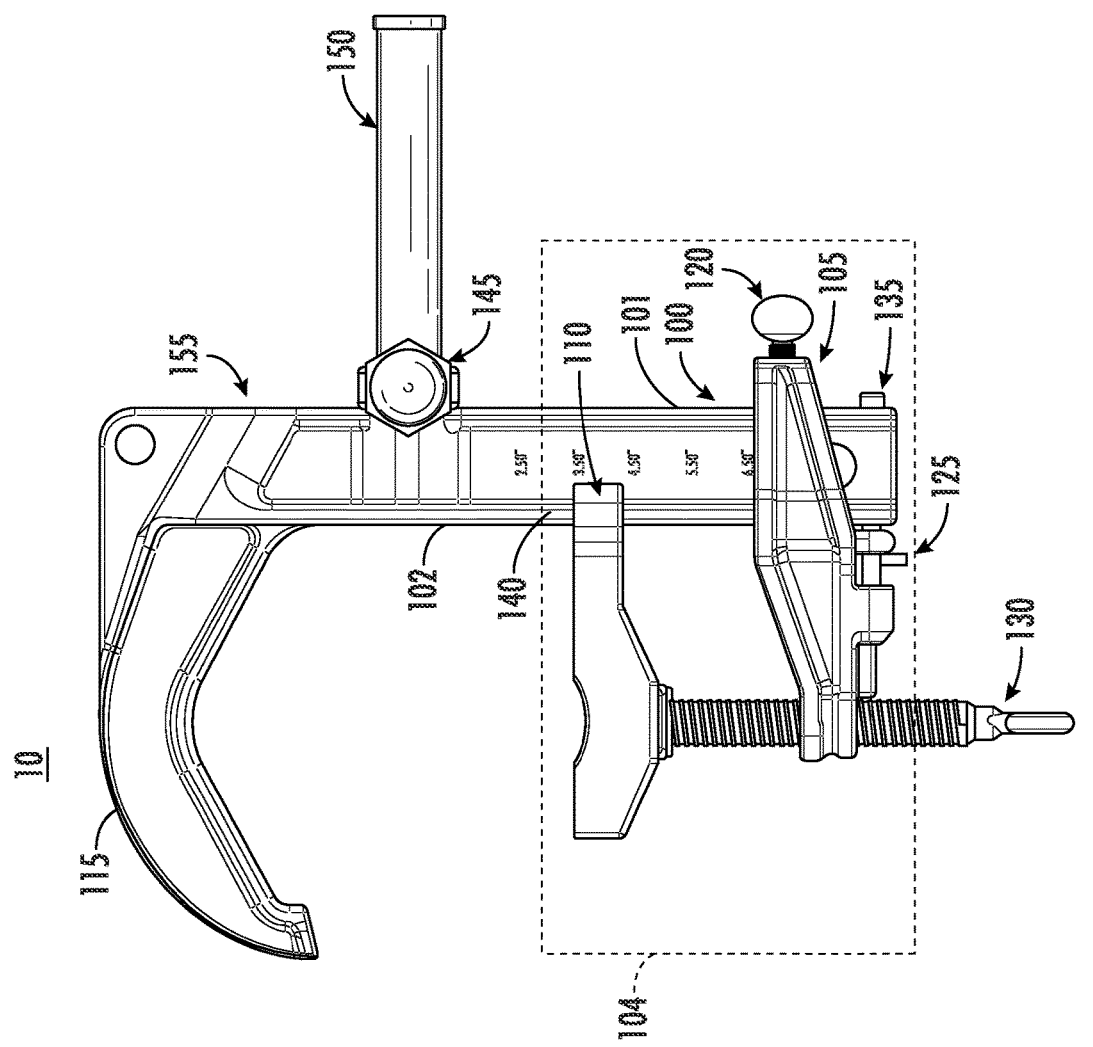
FIG. 1A is a front view of a grounding clamp according to an example embodiment.

With reference to FIGS. 1A and 1B, a grounding clamp 10 is illustrated. Various embodiments of the grounding clamps 10 discussed herein may be configured for use with an overhead electrical conductor. These grounding clamps 10 may be used in conjunction with an elongate stick, pole, hot stick, or shotgun stick that may attach to the fastening mechanism 130 to allow for the grounding clamp 10 to engage with an overhead electrical conductor. In various embodiments, the grounding clamp 10 may have one or more clamp connection methods, such as, for example, a ball stud 145, a contact stud 150, and/or a ferrule connection 155. Various other connection methods may also be used in alternative or additional embodiments.

In various embodiments, the grounding clamp 10 may include a clamp body 100, a lower jaw assembly 104, and an upper jaw 115. In various embodiments, the lower jaw assembly 104 includes a moveable jaw 110 and a support arm 105. In various embodiments, the upper jaw 115 may be fixed relative to the clamp body 100 (e.g., the upper jaw 115 may be unitary with the clamp body 100 as shown in FIG. 1A). In various embodiments, an interior surface of upper jaw 115 may form a generally curvilinear surface that is generally concave, such as shown in FIG. 1A. In various embodiments, the upper jaw 115 may extend to a distal hook that generally includes a substantially linear surface that is angled toward the lower jaw assembly.

In various embodiments, the shape of the moveable jaw 110 and the upper jaw 115 may be based on one or more of the expected conductor shapes to be clamped thereon. In various embodiments, the moveable jaw 110 and the upper jaw 115 may be complimentary shapes, such that the shape defined between the moveable jaw 110 and the upper jaw 115 may be similar to the conductor to be held therein. In some examples, the moveable jaw 110 and the upper jaw 115 may be formed in a shape that allows for a secure engagement with the conductor during operation. For example, and for circular electrical conductors, the moveable jaw 110 and the upper jaw 115 may have opposing concave surfaces, such as shown in FIG. 1A, to allow for surrounding engagement with the conductor.

In various embodiments, the moveable jaw 110 may be moveable along a first axis of the clamp body 100 (e.g., in the upward and downward direction along the clamp body 100 shown in FIG. 1A). As discussed in more detail below with reference to FIG. 4, the clamp body 100 may define a guiding feature 140 in which the one or more guiding feature alignment mechanisms 112 of the moveable jaw 110 may be slidably connected, such that the movement of the moveable jaw 110 is restricted in any direction except along the first axis of the clamp body 100. In various embodiments, the guiding feature alignment mechanism 112 may form a generally hook shape that surrounds the guiding feature 140 of the clamp body 100.

In various embodiments, the guiding feature 140 may include one or more ridges defined along an edge of the second side 102 of the clamp body 100. For example, the guiding feature 140 may include a ridge along each edge of the second side 102 of the body clamp, such that the moveable jaw 110 may move along the clamp body 100 along the first axis of the clamp body 100. In various embodiments, the moveable jaw 110 may be operably coupled to the support arm 105 via a fastening mechanism 130 such as a threaded bolt.

In various embodiments, the support arm 105 may define an opening to receive the clamp body 100, such that the support arm 105 may move along the clamp body 100 in the first direction (e.g., the support arm 105 may surround the clamp body 100). The support arm 105 may be restricted from movement in any axis other than the first axis in both the locked and unlocked position (e.g., the example support arm 105 shown in FIG. 1A can only move upwards and downwards along the clamp body 100 when disengaged).

The support arm 105 may have a plurality of locking positions, such that, in an instance in which the support arm 105 engages with the clamp body 100 via the locking mechanism 120 and/or the balance mechanism 125, the support arm 105 is fixed relative to the first axis of the clamp body 100.

In various embodiments, the support arm 105 may include a locking mechanism 120 and a balance mechanism 125 configured to engage with the clamp body 100 in one of the pluralities of locked positions. In various embodiments, the balance mechanism 125 may be configured to engage with a second side 102 of the clamp body (e.g., the balance mechanism 125 may engage one of the balance mechanism engagement receivers 200A-200D shown in and discussed in more detail below with reference to FIGS. 2A and 2B). In various embodiments, the balance mechanism 125 may be positioned on the underside of the support arm 105 and may include a balance pin 210, which is defined as a protrusion, that moves between an engaged and disengaged position with clamp body 100. In various embodiments and as discussed below with reference to FIGS. 2A and 2B, the balance pin 210 may be sufficiently rigid, such that the engagement of the balance pin 210 with the clamp body 100 may restrict the movement of the support arm 105 along the first axis of the clamp body 100. In various embodiments, the balance mechanism 125 may be a spring-loaded pin. For example, a compression spring 215 may be coupled to the balance pin 210, such that compression spring 215 restrains motion of the balance pin 210 away from the clamp body 100.

In various embodiments, the locking mechanism 120 may be a wing screw configured to be tightened and loosened by a user. The locking mechanism 120 may be configured to engage with a first side 101 of the clamp body 100 (e.g., the locking mechanism 120 may engage one of the locking mechanism engagement receivers 122A-122F shown in and discussed in more detail below with reference to FIGS. 1B, 2A, and 2B).

In various embodiments, the locking mechanism 120 and the balance mechanism 125 are configured to restrict the movement of the support arm 105 along the first axis. Additionally or alternatively, the locking mechanism 120 and the balance mechanism 125 provide counter forces for one another, such that any rotational movement of the support arm 105 may also be restricted. For example, the locking mechanism 120 may engage with a first side 101 of the clamp body 100 (e.g., the locking mechanism 120 may engage one of the locking mechanism engagement receivers 122A-122F shown in and discussed in more detail below with reference to FIGS. 1B, 2A, and 2B) while the balance mechanism 125 engages with a second side 102 of the clamp body (e.g., the balance mechanism 125 may engage one of the balance mechanism engagement receivers 200A-200D shown in and discussed in more detail below with reference with FIGS. 2A and 2B).

Figure 2A:
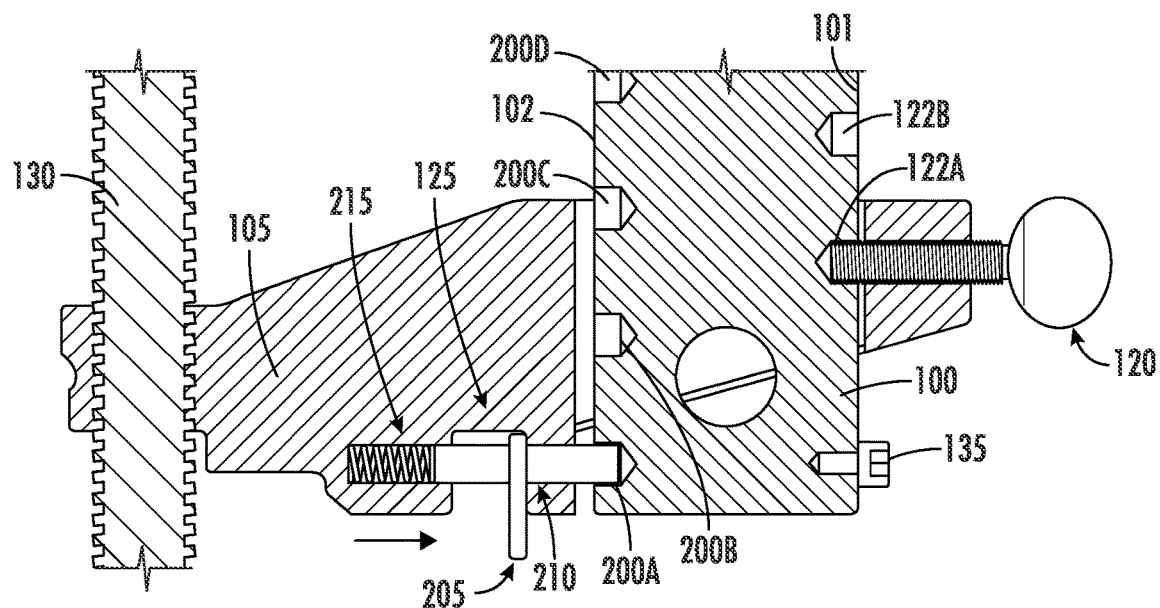
FIG. 2A is a sectional view of the grounding clamp illustrating a support arm engaged with a clamp body according to an example embodiment.
Figure 2B:
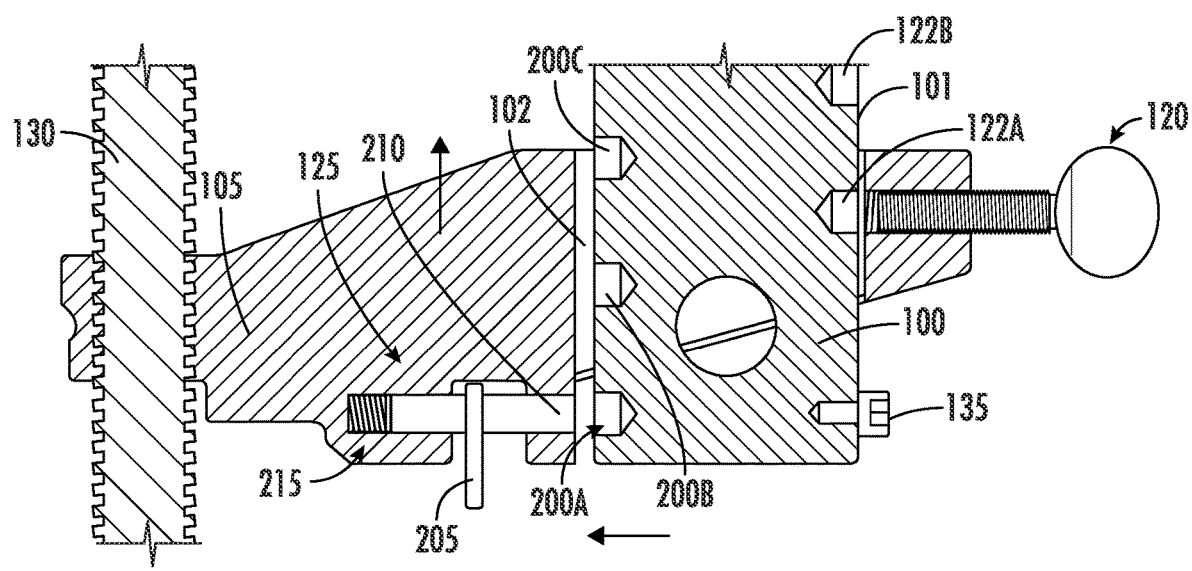
FIG. 2B is a sectional view of the grounding clamp illustrating the support arm engaged with the clamp body according to an example embodiment.

As discussed below, while the locking mechanism 120 and the balance mechanism 125 are shown as a wing screw and a spring-loaded pin respectively, various embodiments of the present disclosure may have different mechanisms to engage with the clamp body. For example, the locking mechanism 120 and/or the balance mechanism 125 may be a pin, a wing screw, a spring-loaded pin, or the like. In various embodiments, the locking mechanism 120 and the balance mechanism 125 may have similar designs (e.g., the locking mechanism 120 may be a wing screw configured to engage the first side 101 of the clamp body 100 and the balance mechanism 125 may also be a wing screw configured to engage the second side 102 of the clamp body). Alternatively, as shown in FIGS. 2A and 2B, the locking mechanism 120 and the balance mechanism 125 may be different designs.

As shown in FIG. 1B and discussed in more detail below with reference to FIGS. 2A-3, various embodiments may include a plurality of locking mechanism engagement receivers 122A-122F. In various embodiments, the locking mechanism 120 may be configured to engage with one of the locking mechanism engagement receivers 122A-122F in an instance in which the support arm 105 is in a locking position. In various embodiments, the locking mechanism engagement receivers 122A-122F may be depressions along the first side 101 of the clamp body 100 that are sufficiently large enough to receive at least a portion of the locking mechanism 120, such that the movement of the support arm 105 may be restricted along the first axis of the clamp body.

Additionally or alternatively, in some embodiments, one or more position markers 124 may be defined along the clamp body 100. In such examples, the top surface 107 of the support arm 105 may align with a position marker 124 in an instance in which the locking mechanism 120 is aligned with one of the plurality of locking mechanism engagement receivers 122A-122F.

In some embodiments, a stop 135 may be provided along the clamp body 100 to keep support arm 105 from separating from the clamp body 100 in an instance the support arm 105 is in the unlocked position (e.g., the support arm 105 may have a receiving aperture configured to receive the clamp body 100). For example, and as shown in FIG. 1A, the stop 135 may be positioned at or near an open end of the clamp body 100 (e.g., the bottom end as shown in FIG. 1A). In various embodiments, the clamp body 100 may also define an upper stop or the like configured to provide an upper bound for the moveable jaw 110 and the support arm 105.

In various embodiments, the moveable jaw 110 moves relative to the support arm 105 along the clamp body 100. In various embodiments, the moveable jaw 110 may be moved along the clamp body via engagement of the fastening mechanism 130. For example, as a user rotates a shotgun stick or the like attached to the fastening mechanism 130. The fastening mechanism 130 upon engagement moves along the first axis (e.g., generally perpendicular to the support arm 105). As the fastening mechanism 130 moves along the first axis, the moveable jaw 110 may also move.

In various embodiments, the support arm 105 and the moveable jaw 110 are configured to move relative to one another as the support arm 105 and the moveable jaw 110 are operably connected via the fastening mechanism 130. In various embodiments, the end of the fastening mechanism 130 may be rigidly attached to moveable jaw 110, such that rotation of the fastening mechanism 130 may result in the movement of the moveable jaw 110.

As shown, the support arm 105 may have a threaded aperture that the fastening mechanism is configured to move therein. In an instance in which the support arm 105 is engaged with the clamp body 100 (e.g., the support arm 105 is fixed relative to the clamp body 100 as discussed herein), the support arm 105 remains in place relative to the clamp body 100, while the fastening mechanism raises or lowers the moveable jaw 110 based upon rotation of the fastening mechanism (e.g., based upon activation of the fastening mechanism 130, such as by a shotgun stick).

In various embodiments, the position of the support arm 105 determines the potential positions of the moveable jaw 110. For example, the distance between the support arm 105 and the upper jaw 115 defines the maximum distance between the upper jaw 115 and the moveable jaw 110 (e.g., the moveable jaw 110 is blocked by the support arm 105 from going below the support arm 105 as shown in FIG. 1A). Additionally, the length of the fastening mechanism 130 also affects the minimum distance between the upper jaw 115 and the moveable jaw 110. For example and in an instance in which the fastening mechanism 130 is fully extended, the distance between the upper jaw 115 and the moveable jaw 110 is based on the difference between the distance between the upper jaw 115 and the support arm 105 and the length of the fastening mechanism 130 (e.g., the moveable jaw 110 may be 2 inches from upper jaw in an instance in which the support arm 105 is 6 inches from the upper jaw 115 and the screw of the fastening mechanism 130 is 4 inches long).

Referring now to FIGS. 2A and 2B, the interaction between the support arm 105 and the clamp body 100 according to an example embodiment is shown. Specifically, FIGS. 2A and 2B illustrate the operation of the locking mechanism 120 and the balance mechanism 125 with respect to various embodiments.

In various embodiments, the clamp body 100 may have a plurality of balance mechanism engagement receivers 200A-200D configured to receive the balance mechanism 125 (e.g., the balance pin 210 may slid into engagement of one of the balance mechanism engagement receivers 200A-200D in an instance in which the balance mechanism 125 is aligned with said balance mechanism engagement receivers 200A-200D). The balance mechanism engagement receivers 200A-200D may be depressions formed along or otherwise defined by the second side 102 of the clamp body 100. In various embodiments, the balance mechanism engagement receivers 200A-200D may be sized to receive and/or surround the balance pin 210, such that the movement of the support arm 105 may be restricted along the first axis of the clamp body 100.

In various embodiments, as discussed above, the balance mechanism 125 may include a compression spring 215 and a balance pin 210. The compression spring 215 may be biased, such that the spring 215 provides a force on the balance pin 210 towards the clamp body 100. In various embodiments, the bias of the compression spring 215 may cause the balance pin to automatically engage with a given balance mechanism engagement receiver 200A-200D upon alignment.

In various embodiments, the balance mechanism 125 may include a disengagement lever 205 configured to allow for disengagement of the balance mechanism 125. The disengagement lever 205 may upon actuation in the direction away from the clamp body 100 (e.g., such as by a user), cause the balance mechanism 125 (e.g., the balance pin 210) to disengage from a given balance mechanism engagement receiver 200A-200D (e.g., the force of the actuation of the disengagement lever 205 may counteract the force of the compression spring 215). Various embodiments of the present disclosure may have a different number of balance mechanism engagement receivers 200A-200D and/or a different number of locking mechanism engagement receivers 122A-122F than shown based on the desired number of locking positions of the grounding clamp 10.

In various embodiments, the support arm 105 may have an unlocked position and a plurality of locking positions. In various embodiments, the unlocked position may be an instance in which the balance mechanism 125 does not align with one of the balance mechanism engagement receivers 200A-200D and the locking mechanism 120 does not align with one of the locking mechanism engagement receivers 122A-122F. In various embodiments, a locking position may be a position in which the balance mechanism 125 may be aligned with one of the balance mechanism engagement receivers 200A-200D. In various embodiments, the locking mechanism 120 may be aligned with one of the locking mechanism engagement receivers 122A-122F in one of the locking positions. In various embodiments, at least one of the balance mechanism 125 or the locking mechanism 120 may be configured to engage the clamp body 100 automatically upon being placed in one of the locking positions. For example, as shown in FIGS. 2A and 2B, the balance mechanism 125 may be spring-loaded, such that, unless the disengagement lever 205 is engaged, the balance mechanism 125 may automatically engage with one of the balance mechanism engagement receivers 200A-200D upon alignment.

As shown in FIG. 2A, the support arm 105 is engaged with the clamp body 100 in a first locking position (e.g., the balance mechanism 125 is aligned with a first balance mechanism engagement receiver 200A and the locking mechanism 120 is aligned with a first locking mechanism engagement receiver 122A).

Referring now to FIG. 2B, while the support arm 105 remains in the first locking position, the support arm 105 is disengaged, such that the support arm 105 is moveable along the clamp body 100. In various embodiments, the support arm 105 may be moved to a second locking position defined as the position in which the balance mechanism 125 aligns with a second balance mechanism engagement receiver 200B. In various embodiments, in the second locking position, the locking mechanism 120 may align with a second locking mechanism engagement receiver 122B. In various embodiments, the support arm 105 may have additional locking positions along the clamp body 100 (e.g., a third locking position may be an instance in which the balance mechanism is aligned with a third balance mechanism engagement receiver 200C).

As shown, the placement of the balance mechanism engagement receivers 200A-200D and the locking mechanism engagement receivers 122A-122F may be coordinated, such that in a given locking position in which the balance mechanism 125 is aligned with one of the balance mechanism engagement receivers 200A-200D, the locking mechanism 120 may also be aligned with one of the locking mechanism engagement receivers 122A-122F. In various embodiments, the balance mechanism engagement receivers 200A-200D and the locking mechanism engagement receivers 122A-122F may have an offset based on the offset of the balance mechanism 125 and the locking mechanism 120 along the first axis (e.g., as shown, the balance mechanism 125 is below the locking mechanism 120). In various embodiments, there may be no offset between the vertical height of the locking mechanism 120 and the balance mechanism 125, such that no offset would be needed between the balance mechanism engagement receivers 200A-200D and the locking mechanism engagement receivers 122A-122F. In various embodiments, the distance between given balance mechanism engagement receivers 200A-200D may coordinate with the locking mechanism engagement receivers 122A-122F. For example, if each locking position is one inch from the next, then each of the balance mechanism engagement receivers 200A-200D and the locking mechanism engagement receivers 122A-122F may both be separated by one inch along the given side of the clamp body.

Figure 3:
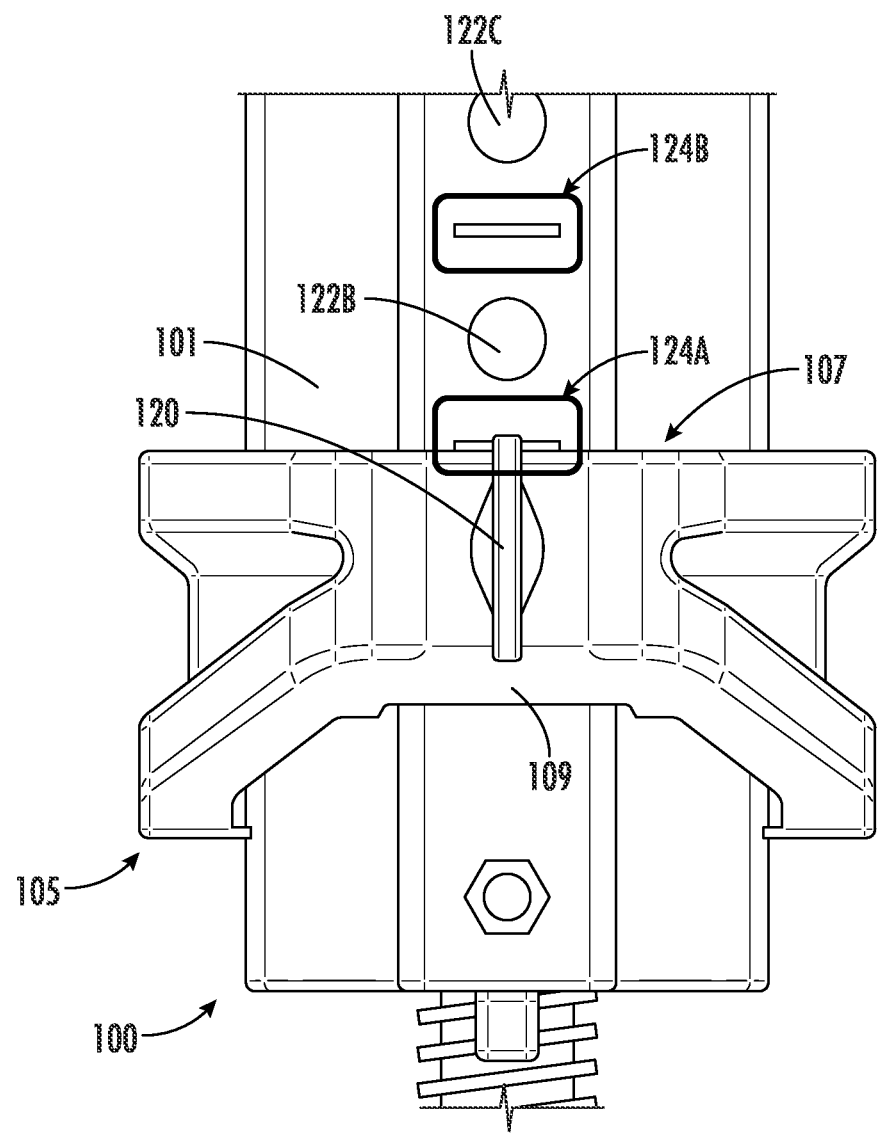
FIG. 3 is a close-up view of the interaction between the support arm and the clamp body according to example embodiments.

FIG. 3 illustrates a marking system according to an example embodiment. In some examples, a marking system is provided along the first side of the clamp body 100 to assist the alignment of the support arm 105 with a given locking positions. As shown, in various embodiments, a position marker 124A may align with the top surface 107 of the support arm 105 in an instance in which the support arm 105 is in a locking position (e.g. the locking mechanism 120 is aligned with the first locking mechanism engagement receiver 122A as shown in FIG. 2A). In various embodiments, one or more position markers 124 may align with the bottom surface 109 of the support arm 105. In various embodiments, the distance between the top surface 107 and the bottom surface 109 of the support arm 105 may be the same as the distance between given locking positions. Alternatively, in some embodiments, two sets of position markers may be provided with one set of position markers configured to align with the top surface 107 and the other set of position markers configured to align with the bottom surface 109.

In some examples, the position markers 124 may only align with one of the top surface 107 or the bottom surface 109 of the support arm 105. In an example embodiment in which the position markers 124 are configured to align with the top surface, the distance between a given locking mechanism engagement receiver (e.g., 122B) and the corresponding position marker (e.g., 124B) may be the distance between the locking mechanism 120 and the top surface 107 of the support arm 105. For example, in an instance in which the distance defined between the locking mechanism 120 and the top surface 107 of the support arm 105 is 0.5 inches, the distance defined between a given locking mechanism engagement receiver (e.g., 122B) and the corresponding position marker (e.g., 124B) would also be 0.5 inches.

In various embodiments, the support arm 105 may be configured such that the distance between the locking mechanism 120 and the top surface 107 of the support arm 105 may be half of the distance between two locking mechanism engagement receivers, such that the position marker 124A, 124B may be defined equidistance from two adjacent locking mechanism engagement receivers. In various embodiments, then position markers 124 may be engraved or drawn onto the clamp body.

Figure 4:
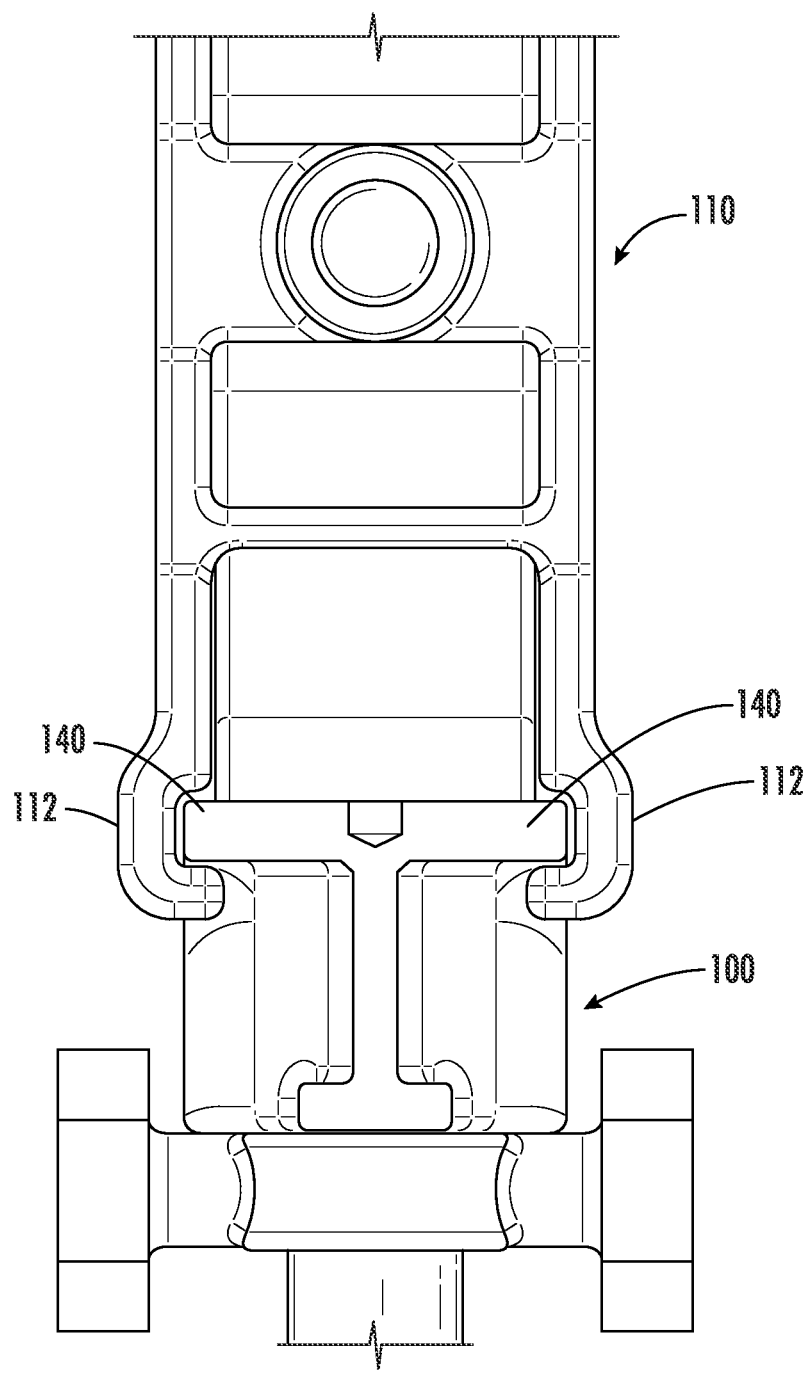
FIG. 4 is a sectional view of the grounding clamp illustrating the connection between a moveable jaw and the clamp body according to an example embodiment.

FIG. 4 is a sectional view of the grounding clamp illustrating the connection between the moveable jaw 110 and the clamp body 100 in accordance with an example embodiment of the present disclosure. In various embodiments, the clamp body 100 may include a guiding feature 140 configured to restrict the movement of the moveable jaw 110 along a second axis (e.g. along the horizontal axis in FIG. 4) and/or third axis (e.g., along the vertical axis in FIG. 4). In various embodiments, the guiding feature 140 allows the moveable jaw 110 to move along the first axis discussed with reference to FIGS. 1A and 1B.

In various embodiments, the guiding feature 140 may be defined at or near the second side 102 of the clamp body 100. For example, in some embodiments, the edges of the second side 102 of the clamp body may be extended beyond the rest of the clamp body 100. Additionally or alternatively, a ridge may be defined on the clamp body 100 along the first axis (e.g., along an edge of the second side 102) configured to receive the guiding feature alignment mechanism 112 of the moveable jaw 110. In some embodiments, a groove may be provided on opposite edge of the clamp body, for an instance in which the moveable jaw 110 has two guiding feature alignment mechanisms 112 (e.g., as shown, a ridge is provided along two edges of the second side 102 of the clamp body 100).

In various embodiment, the guiding feature alignment mechanism 112 of the moveable jaw 110 is configured to provide a C-shape that fits around the guiding feature 140 of the clamp body 100, such that the movement of the moveable jaw 110 is restricted along the second axis and/or the third axis.

Figure 5:
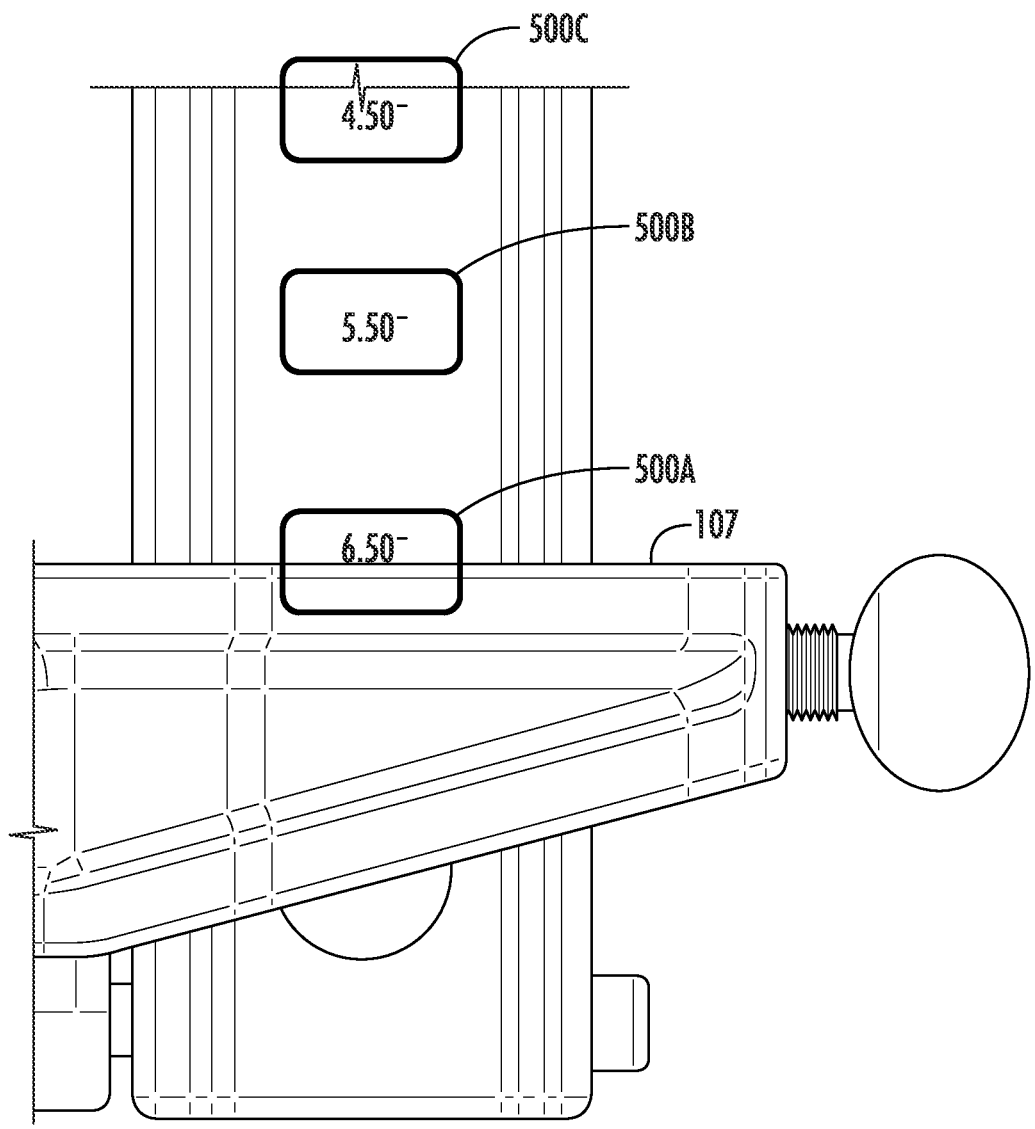
FIG. 5 illustrates range markers along the clamp body according to example embodiments.

FIG. 5 illustrates range markers for use in determine the operating range of the grounding clamp. In various embodiments, each of the range markers 500 may correspond to a locking position. In various embodiments, such as shown, the range markers 500 may provide the operating range at a given locking position (e.g., at the locking position correlated with the range marker 500A may allow the operating range (e.g., size of conductor that could fit between the jaws) to be up to 6.50 inches). In various embodiments, the range markers 500 may also be used to show that the support arm 105 is in a locking position (e.g., just as the position markers along the first side 101 of the clamp body shown in FIGS. 1A and 3). For example, the support arm 105 may be in a locking position in an instance in which the top surface 107 is aligned with the range marker 500. In various embodiments, each of the range markers 500 may be uniformly separated (e.g., range markers 500A-500C are each separated by one inch).

FIGS. 6A-6C illustrate three different example conductors with different sizes and shapes that may be clamped by the grounding clamp 10. The example shown in FIGS. 6A-6C are merely illustrative and are not the only sizes and shapes of conductors that could be engaged by a grounding clamp 10 of various embodiments. In various embodiments, the upper jaw 115 and/or the moveable jaw 110 may have different sizes and/or shapes to receive different conductors better.

As shown in FIGS. 6A and 6B, the grounding clamp 10 may have a minimum round conductor 600A diameter (FIG. 6A) and a maximum round conductor 600B diameter (FIG. 6B). In some embodiments, the minimum round conductor diameter may be determined based on the distance between the support arm 105 and the moveable jaw 110 are positioned as close to the upper jaw 115 as possible.

In various embodiments, as shown in FIG. 6B, the maximum round conductor diameter 600B may be based on the size of the upper jaw 115 in an instance in which the size of the round conductor that can be handled by the upper jaw 115 is less than the maximum opening of the jaws (e.g., in an instance the upper jaw 115 of FIG. 6B is longer such that a larger diameter conductor could be handled, then the maximum opening of the jaws may determine the maximum diameter).

As shown in FIG. 6C, a bus bar with a non-circular conductor shape 600C may have a height of up to the maximum distance between the jaws (e.g., the locking position at the bottom of the clamp body as shown). Additionally, in various embodiments, the maximum width of the conductor may be dictated by the length and/or shape of the upper jaw 115.

Figure 7:
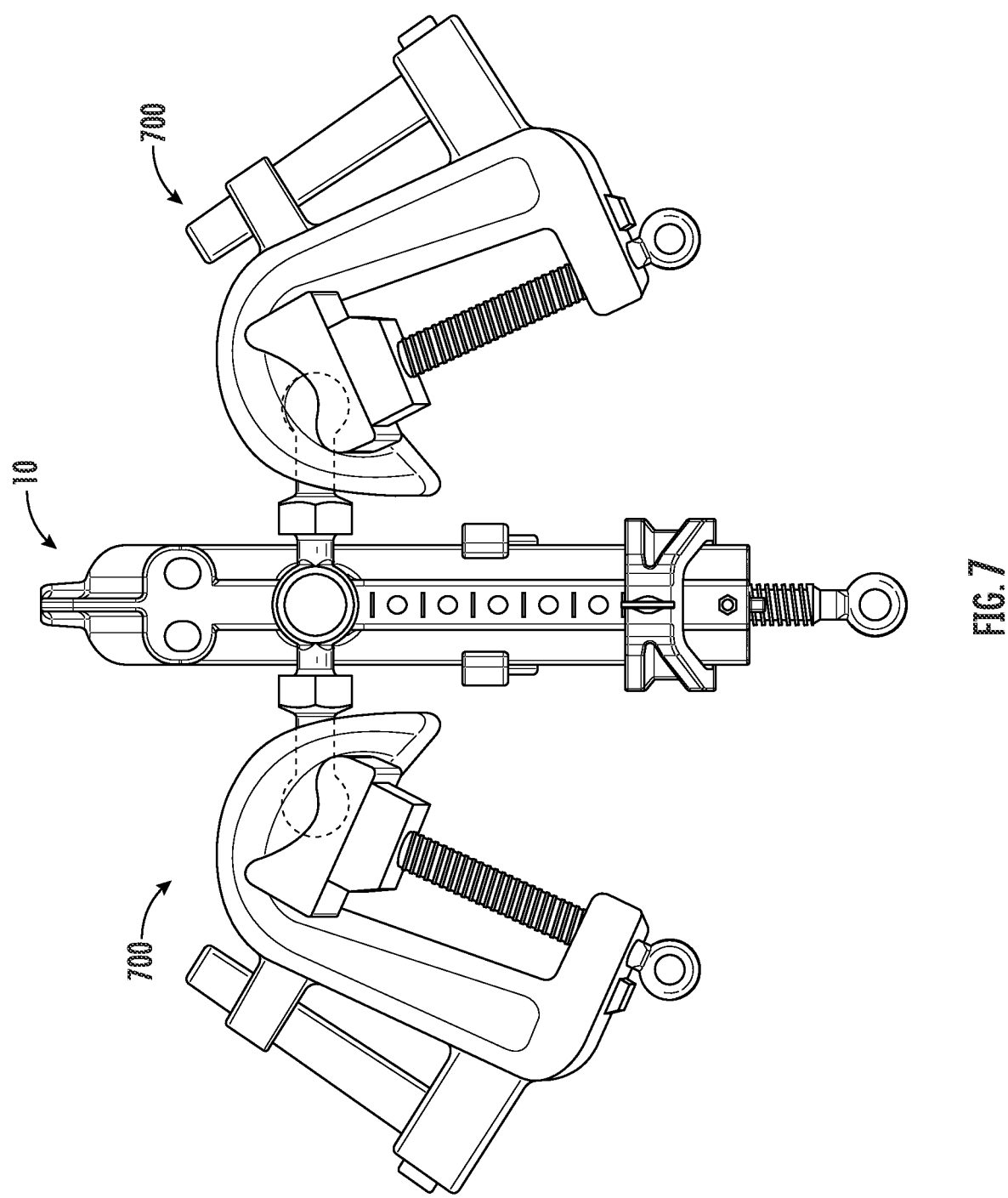
FIG. 7 is an example of ball studs being used to attach clamps to the grounding clamp according to an example embodiment.

FIG. 7 illustrates two accessory clamps 700 attached to the ball studs of an example embodiment. In various embodiments, the grounding clamp 10 may have various connection mechanism including, but not limited to ball studs, contact studs, and/or ferrule connections. For example, the grounding clamp 10 may have a plurality of connection mechanisms for a plurality of accessory clamps 700 to be attached the grounding clamp 10 at the same time. As shown in FIG. 1A, the grounding clamp 10 of various embodiments may have one or more different types of connection mechanisms (e.g., the grounding clamp 10 of FIG. 1A has two ball studs 145, a contact stud 150, and a ferrule connection 155). One of ordinary skill in the art would understand that various connection mechanisms may be used with the grounding clamp discussed herein.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A grounding clamp comprising:
   a clamp body defining a first side and a second side opposite the first side;
   an upper jaw;
   a support arm slidably attached to the clamp body comprising a locking mechanism configured to removably engage the first side of the clamp body and a balance mechanism configured to removably engage the second side of the clamp body, wherein movement of the support arm is restricted upon engagement of the locking mechanism and the balance mechanism; and
   a moveable jaw slideably attached to clamp body and operably coupled to the support arm via a fastening mechanism.

2. The grounding clamp of claim 1, wherein the balance mechanism is spring actuated, such that the balance mechanism is configured to engage with the clamp body in an instance in which the support arm is at one of a plurality of locking positions.

3. The grounding clamp of claim 2, wherein the balance mechanism further comprises a disengaging lever that, upon actuation, disengages the balance mechanism from the clamp body.

4. The grounding clamp of claim 1, wherein the balance mechanism comprises a compression spring attached to the support arm on a first end and an engagement pin on a second end, wherein the engagement pin is configured to be moved between an unlocked position and a locking position with the clamp body.

5. The grounding clamp of claim 1, wherein the clamp body defines a plurality of locking mechanism engagement receivers along the first side of the clamp body and a plurality of balance mechanism engagement receivers along the second side of the clamp body opposite the first side of the clamp body, wherein the locking mechanism is engageable with one of the plurality of locking mechanism engagement receivers and the balance mechanism is engageable with one of the plurality of balance mechanism engagement receivers.

6. The grounding clamp of claim 5, wherein the support arm defines a first locking position and a second locking position, wherein the first locking position is defined as a position in which the balance mechanism is aligned with a first balance mechanism engagement receiver of the plurality of balance mechanism engagement receivers and the second locking position is defined as a position in which the balance mechanism is aligned with a second balance mechanism engagement receiver of the plurality of balance mechanism engagement receivers.

7. The grounding clamp of claim 6, wherein the balance mechanism is configured to movably engage with the first balance mechanism receiver in an instance the support arm is in the first locking position.

8. The grounding clamp of claim 7, wherein the balance mechanism is spring actuated, such that the balance mechanism automatically engages with the first balance mechanism engagement receiver in an instance in which the support arm is in the first locking position.

9. The grounding clamp of claim 6, wherein the locking mechanism is configured to align with a first locking mechanism engagement receiver of the plurality of locking mechanism engagement receivers in an instance in which the support arm is in the first locking position and the locking mechanism is configured to align with a second locking mechanism engagement receiver of the plurality of locking mechanism engagement receivers in an instance in which the support arm is in the second position.

10. The grounding clamp of claim 9, wherein distance between the first balance mechanism engagement receiver and the second engagement receiver is equal to the distance between the first locking mechanism engagement receiver and the second locking mechanism engagement receiver.

11. The grounding clamp of claim 6, wherein the clamp body comprises a plurality of position markers, wherein a first position marker of the plurality of position markers align with at least one of an upper surface or a lower surface of the support arm in an instance in which the support arm is in the first locking position.

12. The grounding clamp of claim 5, wherein the plurality of balance mechanism engagement receivers are equally distanced from one another along the second side of the clamp body.

13. The grounding clamp of claim 1, wherein at least one of the locking mechanism or the balance mechanism are configured to engage with the clamp body such that the motion of the support arm is restricted in a first axis along the clamp body.

14. The grounding clamp of claim 13, wherein the clamp body further comprises a guiding feature along the second side, such that the motion of the moveable jaw is restricted along a second axis along the clamp body.

15. The grounding clamp of claim 1, wherein the balance mechanism and the locking mechanism comprises at least one of a wing screw, a spring-loaded pin, or a pin that is engageable with the clamp body.

16. The grounding clamp of claim 1, wherein the support arm further comprises a threaded aperture configured to receive the fastening mechanism, such that the moveable jaw moves relative to the support arm in an instance the support arm is engaged with the clamp body.

17. The grounding clamp of claim 1, wherein the upper jaw is fixed relative to the clamp body.

18. The grounding clamp of claim 1, wherein the fastening mechanism is configured to be operated via a shotgun stick.

19. The grounding clamp of claim 1, further comprising a connection mechanism, wherein the connection mechanism comprises at least one of a ferrule connection, a ball stud, or a contact stud.

20. A lower jaw assembly for use in a grounding clamp, the lower jaw assembly comprising:
   a support arm slidably attached to a clamp body comprising a locking mechanism configured to removably engage the first side of the clamp body and a balance mechanism configured to removably engage the second side of the clamp body, wherein the movement of the support arm is restricted upon the engagement of the locking mechanism and the balance mechanism; and
   a moveable jaw slideably attached to clamp body and operably coupled to the support arm via a fastening mechanism.

* * * * *